Dec. 23, 1969  J. W. SCHULZE, JR  3,485,264

FLOW CONTROL VALVE

Filed April 4, 1966  2 Sheets-Sheet 1

JAMES W. SCHULZE, JR.
INVENTOR

BY Robert M. Sperry

ATTORNEY

Dec. 23, 1969    J. W. SCHULZE, JR    3,485,264
FLOW CONTROL VALVE
Filed April 4, 1966    2 Sheets-Sheet 2
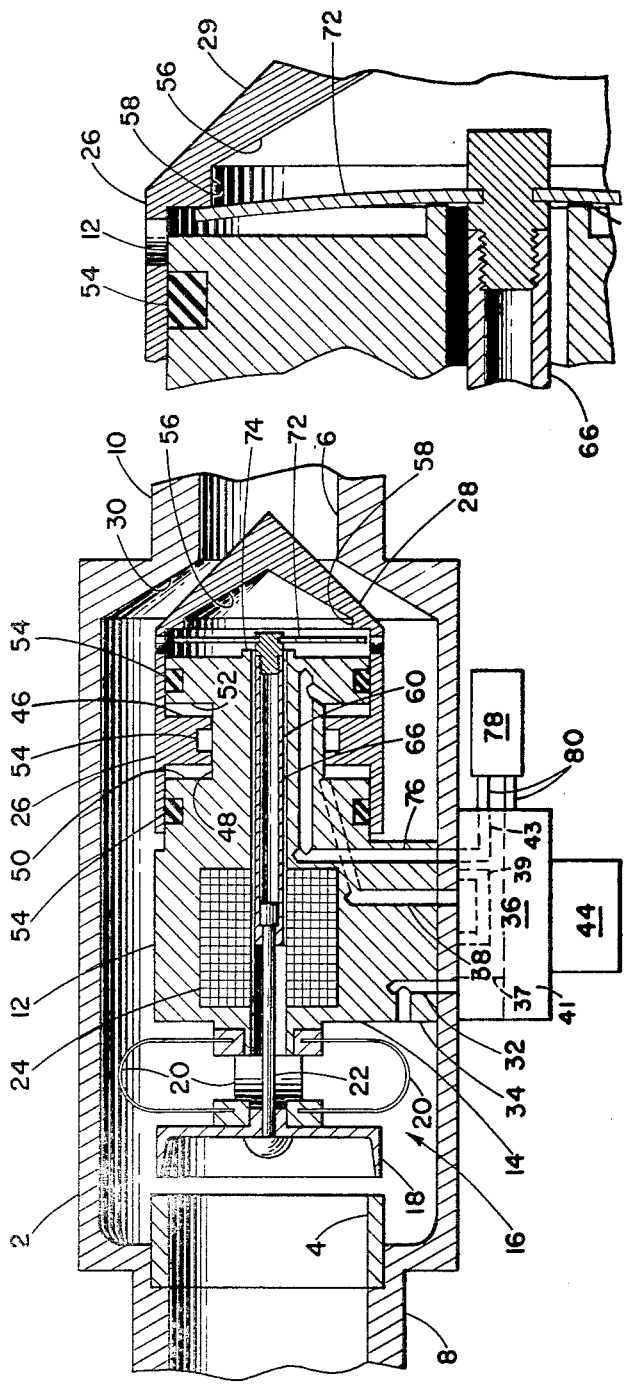
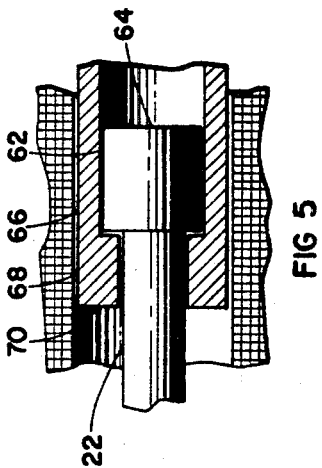
JAMES W. SCHULZE, JR.
INVENTOR
BY *Robert M. Sperry*
ATTORNEY

United States Patent Office 3,485,264
Patented Dec. 23, 1969

3,485,264
FLOW CONTROL VALVE
James W. Schulze, Jr., Irving, Tex., assignor to LTV Electrosystems, Inc., Greenville, Tex., a corporation of Delaware
Filed Apr. 4, 1966, Ser. No. 539,943
Int. Cl. F16k *31/12, 31/36*
U.S. Cl. 137—486                    2 Claims This invention relates to flow control valves and is particularly directed to means employing flow feedback for maintaining a fixed flow rate through a metering orifice regardless of variations in differential pressure across the metering orifice.

Numerous types of flow regulating devices have been proposed heretofore. However, none of the previous devices have been entirely satisfactory. Many of the prior art flow regulators have been heavy, large, and expensive. Other prior art devices have been complicated in construction and unreliable in operation. In contrast, in modern aircraft and space vehicles, the size and weight of components must be minimized. At the same time, accuracy and reliability must be high. Moreover, especially in prelaunch checking of missile systems, it is often desirable to be able to check the operability of servo-systems and the like without passing fluid through the system. Unfortunately, this has not been possible with the vast majority of prior art flow control devices.

These disadvantages of the prior art are overcome with the present invention and a flow control valve is provided which is light, compact and inexpensive, yet is highly accurate and reliable. Moreover, the device of the present invention makes it possible to test the operation of the valve at any time with or without fluid flowing through the system.

The advantages of the present invention are preferably attained by providing a flow control valve comprising a housing having an inlet port and an outlet port, a piston positionable to control the rate of flow of fluid passing through the outlet port, a flow transducer for establishing a first electrical signal indicative of the rate of flow of fluid passing through the inlet port, means establishing a second electrical signal indicative of a desired rate of flow of fluid through the housing, means for comparing the first and second electrical signals and establishing a difference signal, and means responsive to the difference signal for positioning the piston to maintain the desired flow rate.

Accordingly, it is an object of the present invention to provide an improved flow control means.

Another object of the present invention is to provide a flow control valve which is light, compact, accurate, and reliable.

An additional object of the present invention is to provide a flow control valve including means for testing the operation of the valve at any time with or without fluid flowing through the system.

A specific object of the present invention is to provide a flow control valve comprising a housing having an inlet port and an outlet port, a piston positionable to control the rate of flow of fluid passing through the outlet port, a flow transducer for establishing a first electrical signal indicative of the rate of flow of fluid passing through the inlet port, means establishing a second electrical signal indicative of a desired rate of flow of fluid through the housing, means for comparing the first and second electrical signals and establishing a difference signal for positioning the piston to maintain the desired flow rate.

These and other objects and features of the present invention will be apparent from the following detailed description, taken with reference to the figures of the accompanying drawing.

In the drawing:

FIGURE 3 is a vertical section through a modified form of the device of FIG. 1;

FIGURE 4 is an enlarged view of a detail of the device of FIG. 3; and

FIGURE 5 is an enlarged view of an additional detail of the device of FIG. 3.

Figure 1:
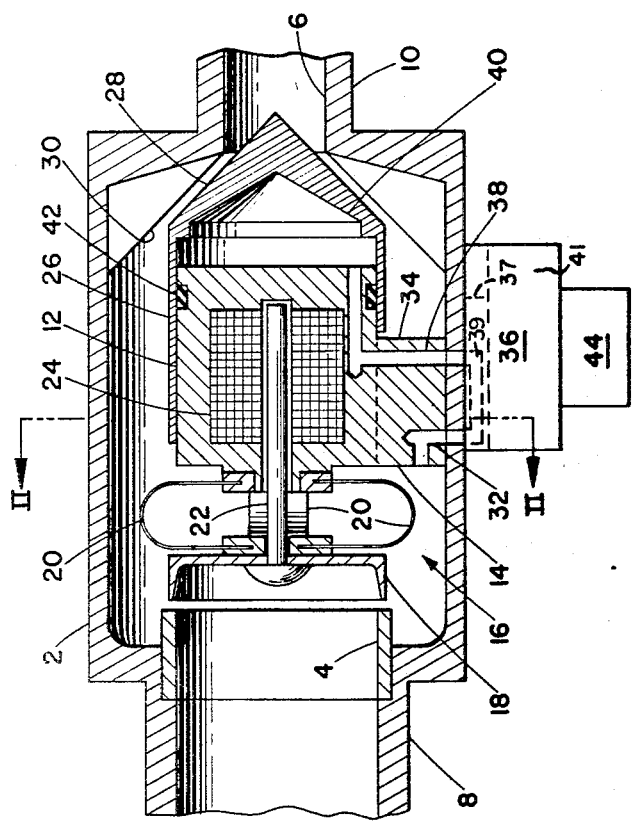
FIGURE 1 is a vertical section through a flow control valve embodying the present invention.

In those forms of the present invention chosen for purposes of illustration, FIG. 1 shows a flow control valve having a housing 2 with an inlet port 4 and outlet port 6. The inlet port 4 is coupled to or formed integral with an inlet conduit 8, while the outlet port 6 is coupled to or formed integral with an outlet conduit 10. Within the housing 2 is mounted a second housing 12 which is concentric with the outer housing 2 and is supported therein by a spider 14 or the like. A flow rate transducer, indicated generally at 16, is provided adjacent the inlet port 4. The transducer 16 may be of any desired type which will establish an electrical signal indicative of the rate of flow of fluid passing through the inlet port 4. As shown, the transducer 16 comprises a poppet-type valve 18 which is resiliently biased by springs 20 to close the inlet port 4, when no fluid is flowing, and which is movable by fluid flowing through inlet port 4 to position armature 22 with respect to coils 24 to establish an electrical signal indicative of the rate of flow of fluid through inlet port 4. The structure and operation of the flow rate transducer 16 are described in detail in my copending patent application, Ser. No. 522,626, filed Jan. 24, 1966, and now abandoned. However, as noted above, any suitable flow rate transducer may be employed.

In addition, a hollow piston 26 encircles the inner housing 12 and has a tapered end portion 28 which is engagable with a suitable seat 30 adjacent outlet port 6. The piston 26 is positionable with respect to seat 30 to regulate the rate of flow of fluid through outlet port 6. To position the piston 26, fluid from within outer housing 2 is drawn through fluid conduit 32 in leg 34 of spider 14 and is passed, under the control of servo valve 36, through conduit 38 to chamber 40 formed between the end of inner housing 12 and the interior of piston 26. Servo valve 36 may comprise a slidable member 37 containing a conduit 39 which may be movably positioned, as by servomotor 41, to control the rate of flow of fluid between conduits 32 and 34. Suitable seals 42 are provided between the exterior of housing 12 and the walls of piston 26 to prevent fluid leakage.

To control the positioning of piston 26, an electrical servo control circuit 44 is provided which may comprise a conventional slide-wire bridge wherein the differential output drives servomotor 41 to position valve 36. The electrical signal from transducer 16, indicating the actual fluid flow rate, is supplied by any suitable means, not shown, to control circuit 44 where it is algebraically added to a second electrical signal, indicative of the desired flow rate, to derive a difference signal which is supplied to suitable means, not shown, to appropriately position servo valve 36 to control passage of fluid into or out of chamber 40. The second electrical signal, indicating the desired flow rate, may be developed within the control circuit 44, by a rheostat or the like, or may be supplied by external means to permit remote control.

In operation, the flow rate of fluid passing through inlet port 4 is measured by flow rate transducer 16 which supplies a first electrical signal, indicative of this flow rate, to the servo control circuit 44. The control circuit 44 compares this first electrical signal with a second electrical signal which is indicative of the desired flow rate and derives a difference signal which is applied to actuate servo valve 36 to adjust the flow of fluid through conduits 32 and 34 into or out of chamber 40 to appropriately vary the position of piston 28 to maintain the desired flow rate.

Figure 2:
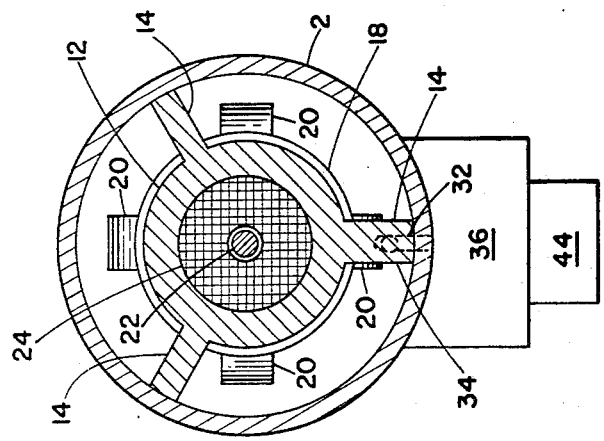
FIGURE 2 is a transverse section through the device of FIG. 1, taken on the line II—II thereof.

FIG. 3 shows a modified form of the flow control valve of FIG. 1, in which, it is possible to check the operation of the flow control valve, even with no fluid flowing through conduits 8 and 10. Many of the parts of the valve of FIG. 2 are identical with corresponding parts of the valve of FIG. 1, and have been designated by the same reference numerals. In this form of the invention, the piston 26 is formed with an inwardly projecting annular portion 46, and inner housing 12 is formed with a recess 48, which cooperates with the annular portion 46 of piston 26 to form two chambers 50 and 52. Suitable sealing means 54 are provided between the annular portion 46 and the seat of the recess 48, and between piston 26 and housing 12 on opposite sides of the recess 48. In addition, the piston 26 is formed with a chamber 56 adjacent the tapered end 28 thereof and has an annular shoulder 58 formed within the chamber 56. The housing 12 has an axial opening 60 extending therethrough and communicating with the core of the coils 24, at one end, and with chamber 56 of piston 26, at the other end. An annular collar 62 is formed adjacent the inner end 64 of armature 22, and a tubular member 66 is provided which is slideable about the collar 62 within the opening 60. One end 68 of the tubular member 66 extends into the core of the coils 24 to a point beyond the "no flow" position of end 64 of armature 22 and is formed with an inwardly projecting flange 70. At its opposite end, tubular member 66 is secured to a disc 72 which extends radially of the tubular member 66 to a point adjacent the walls of chamber 56. Housing 12 has an annular projection 74 encircling opening 60 and extending into chamber 56 toward disc 72. Also, housing 12 is formed with a first fluid conduit 38, communicating between servo-valve 36 and chamber 50, and a second fluid conduit 76, communicating between servo-valve 36 and chamber 52. Finally, a source 78 of high pressure fluid is connected to the servo-valve 36 by fluid conduits 80.

In operation, to test the functioning of the valve at a time when there is no fluid flow through conduits 8 and 10, the control circuit 44 actuates servo-valve 36 to supply high pressure fluid from source 78 through conduit 76 to chamber 52. For this purpose, slide 37 of servo valve 36 may contain an additional conduit 43 positionable to connect conduits 76 and 80 when conduit 39 is positioned to block fluid flow between conduits 32 and 38. This drives piston 26 to the left, opening outlet port 6. For test purposes, piston 26 is driven to the left beyond the maximum position to which it would be driven in normal operation. During this overtravel, shoulders 58 of chamber 56 bear against the edges of disc 72. As seen in FIG. 4, this causes disc 72 to cantilever about the annular projection 74, with the result that tubular member 66 is caused to move to the right. When this occurs, flange 70 of tubular member 66 engages collar 62 of armature 22, driving armature 22 to the right and causing poppet valve 18 to open. At the same time, the movement of armature 22 causes flow rate transducer 16 to emit an electrical signal representing the movement of armature 22. This signal indicates that the valve is functioning properly, despite the fact that there is no fluid flowing through conduits 8 and 10.

For normal operation, control circuit 44 actuates servo-valve 36 to block the flow of high pressure fluid from source 78, and to connect conduit 38 to conduit 32.

Thereafter, when fluid is allowed to flow through conduits 8 and 10, the valve will function in the manner described above, with respect to FIG. 1.

Obviously, numerous other variations and modifications may be made without departing from the present invention. Accordingly, it should be clearly understood that the forms of the present invention described above and shown in the figures of the accompanying drawing are illustrative only and are not intended to limit the scope of the invention.

What is claimed is:

1. A flow control valve comprising:

a housing having an inlet port and an outlet port;
a piston positionable to control the rate of flow of fluid passing through said outlet port;
a source of high pressure fluid;
a flow transducer for establishing a first electrical signal indicative of the rate of flow of fluid passing through said inlet port, said transducer including
an electric coil,
an armature movable with respect to said coil in response to variation of the rate of flow of fluid through said housing, and
means actuable in response to movement of said piston by said high pressure fluid to cause movement of said armature with respect to said coil;
means establishing a second electrical signal indicative of a desired rate of flow of fluid through said housing;
means for comparing said first and second electrical signals and establishing a difference signal;
signal responsive means responsive to said difference signal for supplying fluid flowing through said housing to said piston to position said piston to maintain said desired rate of flow of fluid through said housing; and
means for causing said signal responsive means to permit passage of high pressure fluid from said source to said piston to actuate said piston in the absence of fluid flow through said housing.

2. The device of claim 1, wherein the last named means comprises:

a collar secured to one end of said armature,
a tubular member having one end thereof extending about said one end of said armature and formed with an inwardly extending flange,
laterally extending means secured to the opposite end of said tubular member and having portions movable by said piston when said piston is actuated by said high pressure fluid,
and means engageable with said laterally extending means to cause cantilevering of said laterally extending means in response to movement of said portions by said piston.

References Cited

UNITED STATES PATENTS

| | | | |
|---|---|---|---|
| 1,201,426 | 10/1916 | Anderson | 137—487.5 XR |
| 2,646,932 | 7/1953 | Frost | 137—487.5 XR |
| 2,948,295 | 8/1960 | Smith | 137—487.5 |
| 3,017,556 | 1/1962 | Smoot | 137—487.5 XR |
| 3,077,552 | 2/1963 | Koppel | 137—487.5 XR |
| 2,917,069 | 12/1959 | Lundy et al. | 251—133 XR |
| 3,068,387 | 12/1962 | Koppel | 137—487.5 XR |
| 3,070,974 | 1/1963 | Greenwald | 251—133 XR |
| 3,267,958 | 8/1966 | Weisheit | 137—487.5 XR |

M. CARY NELSON, Primary Examiner

R. J. MILLER, Assistant Examiner

U.S. Cl. X.R.

137—487.5